US009135007B2

(12) United States Patent
Yamazaki

(10) Patent No.: US 9,135,007 B2
(45) Date of Patent: Sep. 15, 2015

(54) PROCESSING UNIT AND MICRO CONTROLLER UNIT (MCU)

(75) Inventor: Takanaga Yamazaki, Tama (JP)

(73) Assignee: Sanken Electric Co., Ltd., Niiza-shi, Saitama-Ken (JP)

(*) Notice: Subject to any disclaimer, the term of this patent is extended or adjusted under 35 U.S.C. 154(b) by 648 days.

(21) Appl. No.: 13/555,126

(22) Filed: Jul. 21, 2012

(65) Prior Publication Data

US 2013/0024673 A1 Jan. 24, 2013

(30) Foreign Application Priority Data

Jul. 21, 2011 (JP) ................................ 2011-160290

(51) Int. Cl.
G06F 9/00 (2006.01)
G06F 9/44 (2006.01)
G06F 9/30 (2006.01)

(52) U.S. Cl.
CPC .......... G06F 9/30072 (2013.01); G06F 9/3001 (2013.01); G06F 9/30032 (2013.01); G06F 9/30079 (2013.01)

(58) Field of Classification Search
None
See application file for complete search history.

(56) References Cited

U.S. PATENT DOCUMENTS

| 6,163,143 | A | * | 12/2000 | Shimamori | 323/284 |
| 8,487,655 | B1 | * | 7/2013 | Kutz et al. | 326/86 |
| 8,547,135 | B1 | * | 10/2013 | Yarlagadda et al. | 326/38 |
| 2003/0051192 | A1 | * | 3/2003 | Pillay et al. | 714/39 |
| 2003/0093702 | A1 | * | 5/2003 | Luo et al. | 713/320 |
| 2004/0251941 | A1 | * | 12/2004 | Shi et al. | 327/172 |
| 2006/0186955 | A1 | * | 8/2006 | Quilter | 330/10 |
| 2006/0212679 | A1 | * | 9/2006 | Alfano et al. | 712/38 |

(Continued)

FOREIGN PATENT DOCUMENTS

| JP | 53-022340 A | 3/1978 |
| JP | 54-092036 A | 7/1979 |

(Continued)

OTHER PUBLICATIONS dsPIC33F Family Reference Manual Part 1, Chapter: Section 2 CPU, p. 2-1, Article No. DS70204B, Medium: [online], Publication year: 2009, Search Date: Jul. 7, 2011, Information source: Internet <http://ww1.microchip.com/downloads/en/DeviceDoc/70204B.pdf> by Microchip Technology Inc.

(Continued)

Primary Examiner — Michael Sun
(74) Attorney, Agent, or Firm — Miles & Stockbridge P.C.

(57) ABSTRACT

A technology capable of reducing load on both system processing and filter operation and improving power consumption and performance is provided. In a digital signal processor, a program memory, a program counter, and a control logic circuit are provided, and a bit field of each instruction includes instruction stop flag information and bit field information. Also, the control logic circuit carries out the control in such a manner that the instruction whose instruction stop flag information is cleared is executed as is to proceed to the next instruction processing, execution of the instruction whose instruction stop flag information is set is stopped if an execution resumption trigger condition corresponding to the bit field information is not satisfied, and the instruction whose instruction stop flag information is set is executed if the execution resumption trigger condition corresponding to bit field information is satisfied, to proceed to the next instruction processing.

14 Claims, 6 Drawing Sheets

(56) References Cited

U.S. PATENT DOCUMENTS

| | | | |
|---|---|---|---|
| 2006/0262843 A1* | 11/2006 | Kim et al. | 375/238 |
| 2007/0071086 A1* | 3/2007 | Botti et al. | 375/238 |
| 2009/0021233 A1* | 1/2009 | Hsu | 323/290 |

FOREIGN PATENT DOCUMENTS

| | | |
|---|---|---|
| JP | 62-001042 A | 1/1987 |
| JP | 11-085963 A | 3/1999 |

OTHER PUBLICATIONS

TMS320F28030, TMS320F28031, TMS320F28032, TMS320F28033, TMS320F28034, TMS320F28035 Piccolo Microcontrollers, Chapter: 3.3 Brief Descriptions, p. 27-34, Article No. SPRS584E—Apr. 2009—Revised Mar. 2011, Medium: [online], Publication year: Apr. 2009, Mar. 2011 (revised), Search Date: Jul. 7, 2011, Information source: Internet <http://focus.tij.co.jp/jp/lit/ds/symlink/tms320f28030.pdf>, by Texas Instruments Inc.

NJU20010 DSC for Digital Power Supply Control, Chapter: 4. Outline of Ximo16 Architecture, p. 16-23, Article No. Ver. Jun. 30, 2010, Medium: [online], Publication year: Jun. 30, 2010, Search Date: Jul. 7, 2011, Information source: Internet <http://semicon.njr.co.jp/digital-power-control/index.html> by New Japan Radio, Co., Ltd.

Freescale Semiconductor, "MPC5674F Microcontroller Reference Manual Device Supported: MPC5674F MPC5673F", pp. 1-4-1-11, 1-15-1-18, 22-1-22-4, 22-42-22-43, 22-56-22-58, 26-1-26-5, 27-1-27-50, [online]. Aug. 2010, datasheetarchieve.com, Searched on Aug. 5, 2014, Internet <URL:http://www.datasheetarchieve.com/d1/Datasheets-SW1/DSASW0012998.pdf>.

S. Tanaka, "Imadokino Power • Electronics", Transistor Gizyutu CQ Shuppansya, Oct. 1, 2010, the 47th Volume, No. 10, pp. 70-84.

Office Action issued Dec. 5, 2014, in Chinese Patent Application No. 201210260042.X.

* cited by examiner

FIG. 5

| Instruction Format | | | | | | | | Instruction | Operation | Exec. Cycle |
|---|---|---|---|---|---|---|---|---|---|---|
| MSB(bit15) | | | | | | | LSB(bit0) | | | |
| TRIG_WAIT | TRIG_WHAT | EVENT | OPCODE | | | FIELD A | FIELD B | | | |
| T | WHAT | E | 0 | 0 | 0 | don't care | don't care | 0x0 NOP | No Operation | |
| T | WHAT | E | 0 | 0 | 1 | don't care | next PC | 0x1 JMP | Jump | 1 |
| T | WHAT | E | 0 | 1 | 0 | Rm | Rn | 0x2 MUL | ACC ← Rn × Rm | 1 |
| T | WHAT | E | 0 | 1 | 1 | Rm | Rn | 0x3 MAC | ACC ← ACC+Rn × Rm | 1 |
| T | WHAT | E | 1 | 0 | 0 | Rm | Rn | 0x4 DIV | ACC ← Rn / Rm | 8 |
| T | WHAT | E | 1 | 0 | 1 | Rm | #n | 0x5 LSF | ACC ← Rm << #n | 1 |
| T | WHAT | E | 1 | 1 | 0 | Rm | #n | 0x6 RSF | Rm ← ACC >> #n | 1 |
| T | WHAT | E | 1 | 1 | 1 | Rm | Rn | 0x7 MVC | Chain Move (delay element) Rm ← Rm−1 ← ... ← Rn+1 ← Rn Initial Rm is destroyed. Rn is kept same value | 1 |

FIG. 6

| Register | DSP0TRG | DSP 0 Execution Trigger Status | Address | 0xFxxx |
|---|---|---|---|---|
| Register | DSP1TRG | DSP 1 Execution Trigger Status | Address | 0xFxxx |

| Bit | Bit Name | R/W | Initial | Description | Note |
|---|---|---|---|---|---|
| 7 | SET_R7 | R/W | 0 | DSP Execution Trigger Status<br>Each bit shows corresponding register file (R0-R7) is written or not.<br>If CPU or DMAC writes a value to R0-R7, corresponding bit is automatically set.<br>And DSP instruction whose TRIG_WAIT flag is set temporary stops before its execution and watches SET_R0-SET_R7 according to its trigger selection TRIG_WHAT and if corresponding bit in this register is set (detected update of R0-R7), the instruction will be executed and go to next sequence. At this time, corresponding SET_Rx is cleared automatically.<br>Note that the register basically shows only trigger status and CPU does not need to access it. But for debugging capability or for re-initialization, this register can be accessed by CPU (Read or Write forcibly). | |
| 6 | SET_R6 | R/W | 0 | | |
| 5 | SET_R5 | R/W | 0 | | |
| 4 | SET_R4 | R/W | 0 | | |
| 3 | SET_R3 | R/W | 0 | | |
| 2 | SET_R2 | R/W | 0 | | |
| 1 | SET_R1 | R/W | 0 | | |
| 0 | SET_R0 | R/W | 0 | | |

PROCESSING UNIT AND MICRO CONTROLLER UNIT (MCU)

CROSS-REFERENCE TO RELATED APPLICATION

The present application claims priority from Japanese Patent Application No. 2011-160290 filed on Jul. 21, 2011, the content of which is hereby incorporated by reference into this application.

TECHNICAL FIELD OF THE INVENTION

The present invention relates to a technology of a processing unit, and more particularly to a technology effectively applied to a processing unit such as a digital signal processor (DSP) built in a micro controller unit (MCU) for a digital controlled power supply system and a micro controller unit having the processing unit built therein.

BACKGROUND OF THE INVENTION

For example, in a micro controller for use with a digital controlled power supply system, the digital controlled power supply system needs a digital filter operation function for the calculation for phase compensation in its feedback control loop. In order to enable such digital filter operation function in addition to other various operation functions of systematic processing, an instruction for multiplication and accumulation (MAC), which is installed in a general use DSP, is provided in a CPU core of the micro controller, and filter operation and systematic processing are executed under the same CPU core.

Such a micro controller for use with a digital controlled power supply system is disclosed in, for example:

(1) dsPIC33F Family Reference Manual Part 1, Chapter: Section 2 CPU, Page 2-1, Article No.: DS70204B, Medium: [online], Publication year: 2009, Search Date: Jul. 7, 2011, Information source: Internet <http://ww1.microchip.com/downloads/en/DeviceDoc/70204B.pdf> by Microchip Technology Inc. (Non-Patent Document 1);

(2) TMS320F28030, TMS320F28031, TMS320F28032, TMS320F28033, TMS320F28034, TMS320F28035 Piccolo Microcontrollers, Chapter: 3.3 Brief Descriptions, Page 27-34, Article No.: SPRS584E-APRIL 2009-REVISED MARCH 2011, Medium: [online], Publication year: April, 2009, March, 2011 (revised), Search Date: Jul. 7, 2011, Information source: Internet <http://focus.tij.co.jp/jp/lit/ds/symlink/tms320f28030.pdf>, by Texas Instruments Inc. (Non-Patent Document 2); and (3) NJU20010 DSC for Digital Power Supply Control, Chapter: 4. Outline of Ximo16 Architecture, Page 16-23, ArticleNo.: Ver. 2010.6.30, Medium: [online], Publication year: Jun. 30, 2010, Search Date: Jul. 7, 2011, Information source: Internet <http://semicon.njr.co.jp/digital-power-control/index.html> by New Japan Radio, Co., Ltd (Non-Patent Document 3).

SUMMARY OF THE INVENTION

The inventor examined the conventional micro controller units for a digital controlled power supply system including those of the Non-Patent Documents 1-3 mentioned above and found the following facts.

For example, systematic processing in the digital controlled power supply system includes various processes such as abnormality detection, protecting action, communication with outside, logging, and others. Since filter operation has to be executed in addition to them, measures for improving performance such as raising the operating frequency of a CPU core are needed for ensuring processing performance. This results in the increase of power consumption in itself and the reduction in power efficiency of the power supply during low load conditions.

On the other hand, under a circumstance in which a performance of the CPU used in the system is low or does not satisfy required data processing, it causes a problem that a sampling period for digital control becomes longer, and accordingly the cycle of a pulse width modulation (PWM) waveform which drives the power MOS transistor of a converter circuit in power supply system does not become short. As a result, the constant of an LC filter circuit on an external power circuit becomes larger, and the size of a power supply unit and the cost thereof are both increased.

In order to improve the problems above, the inventor considered to build a small-scale DSP with a digital filter operation function in the digital controlled power supply system, in which the DSP shares calculations for phase compensation in the feedback control loop of the digital controlled power supply system and found a new method for staring and operating this DSP, which enables such built-in small-scale DSP operable independently from, and simultaneously with, the CPU.

Accordingly, an object of the present invention is to provide a technology capable of reducing loads on both system processing and filter operation and improving the power consumption and performance.

The above and other objects and novel characteristics of the present invention will be apparent from the description of the present specification and the accompanying drawings.

The following is brief descriptions of a processing unit and a micro controller according to the present invention, respectively.

(1) A micro controller according to one aspect of the present invention is configured for use with a digital controlled power supply system in which a DC-DC conversion of a power supply is performed in accordance with a duty of a pulse width modulation waveform which drives power MOS transistors configuring a DC-DC conversion circuit.

The micro controller is preferably built on one chip of a semiconductor substrate and comprises, built on said one chip semiconductor substrate, a pulse width modulator configured to calculate a duty of a pulse width modulation waveform and to drive the power MOS transistors in the DC-DC conversion circuit based on the calculated duty of the pulse width modulation waveform; an A/D converter configured to perform A/D conversion of voltage signals supplied from the DC-DC conversion circuit; a filter operation processing unit configured to perform filter operation of data from the A/D converter and to supply results of the filter operation to said pulse width modulator; and a central processing unit configured to perform system processing, in which the loop including the DC-DC conversion circuit, the A/D converter, filter operation, and the pulse width modulator configures a feedback control loop configured to perform a phase compensation in the digital controlled power supply system.

The filter operation processing unit is configured to comprise a program memory configured to store an operation processing sequence for the filter operation, which is configured with a row of instructions; a program counter configured to set information indicative of which instruction is to be executed in the operation processing sequence; and a control logic circuit configured to control execution of the operation processing sequence.

The control logic circuit is configured to perform storing in the program memory the operation processing sequence, wherein each of the instructions of the operation processing sequence is configured to include a bit field having instruction stop flag information indicative of whether to stop execution of the instruction and bit field information indicative of an execution resumption trigger condition of the instruction; setting in the program counter information indicative of which instruction is to be executed in the operation processing sequence; and executing an instruction whose instruction stop flag information is cleared and proceeding to processing of the next instruction, in which execution of the instruction whose instruction stop flag information is set is temporarily halted if the execution resumption trigger condition in the bit field information is not satisfied, and execution of the instruction whose instruction stop flag information is set is resumed if the execution resumption trigger condition in the bit field information is satisfied, and processing of the processing sequence is proceeded to the next instruction.

Thus, with such configurations, the filter operation processing unit is configured to control starting, temporal halting and resuming of the operation processing sequence based on the information set in the bit field of each instruction so as to execute processing of the feedback control loop independently from and simultaneously with the system processing running under control of the central processing unit.

(2) The filter operation processing unit having the configurations explained above may be manufactured separately from the micro controller and may be assembled on a circuit board together with the micro controller and the DC-DC converter. Or the circuit resources of the filter operation processing unit may be included in a library as the design resources.

As effects obtained by embodiments of the invention disclosed in the present application, the load on both the system processing and filter operation can be reduced and the power consumption and performance can be improved.

BRIEF DESCRIPTIONS OF THE DRAWINGS

FIG. 5 is a table of instruction set of digital signal processor which utilizes this invention as an example;

FIG. 6 is a specification description of control/status register in control logic circuit of digital signal processor which utilizes this invention as an example.

DESCRIPTIONS OF THE PREFERRED EMBODIMENTS

Figure 1:
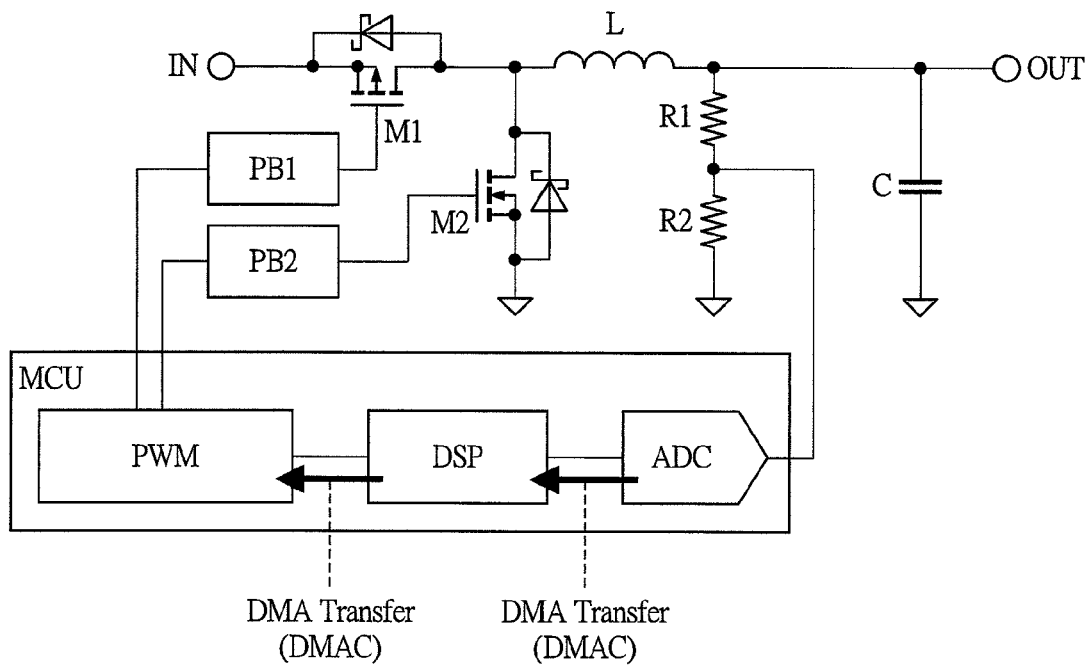
FIG. 1 is a block diagram of DC-DC converter system controlled by a micro controller unit which utilizes this invention as an example.

In the embodiments described below, the invention will be described in a plurality of sections or embodiments when required as a matter of convenience. However, these sections or embodiments are not irrelevant to each other unless otherwise stated, and the one relates to the entire or a part of the other as a modification example, details, or a supplementary explanation thereof. Also, in the embodiments described below, when referring to the number of elements (including number of pieces, values, amount, range, and the like), the number of the elements is not limited to a specific number unless otherwise stated or except the case where the number is apparently limited to a specific number in principle. The number larger or smaller than the specified number is also applicable.

Further, in the embodiments described below, it goes without saying that the components (including element steps) are not always indispensable unless otherwise stated or except the case where the components are apparently indispensable in principle. Also, even when mentioning that constituent elements or the like are "made of A" or "made up of A" in the embodiments below, elements other than A are of course not excluded except the case where it is particularly specified that A is the only element thereof. Similarly, in the embodiments described below, when the shape of the components, positional relation thereof, and the like are mentioned, the substantially approximate and similar shapes and the like are included therein unless otherwise stated or except the case where it is conceivable that they are apparently excluded in principle. The same goes for the numerical value and the range described above.

Hereinafter, embodiments of the present invention will be described in detail with reference to the accompanying drawings. Note that components having the same function are denoted by the same reference symbols throughout the drawings for describing the embodiments, and the repetitive description thereof will be omitted.

Outline of Embodiments

A processing unit {corresponding components and reference symbols and others are indicated in ( ) as examples} according to an embodiment of the present invention is a processing unit (digital signal processor DSP) including: a program memory (PM) configured to store an operation processing sequence configured with a row of instructions; a program counter (PC) configured to set a position (designated by a program address) indicative of which instruction is to be executed in the operation processing sequence; and a control logic circuit (CL) configured to control operation processing of the operation processing sequence.

In the configuration above, each instruction is configured to include a bit field having instruction stop flag information (TRIG_WAIT) indicative of whether to stop execution of the instruction and bit field information (TRIG_WHAT) indicative of an execution resumption trigger condition of the instruction. The control logic circuit configured to carry out the control of the operation processing sequence in such a manner that the instruction whose instruction stop flag information is cleared is executed and then processing the next instruction, in which execution of the instruction whose instruction stop flag information is set is stopped or temporarily halted if the execution resumption trigger condition in the bit field information is not satisfied, and execution of the instruction whose instruction stop flag information is set is resumed if the execution resumption trigger condition in the bit field information is satisfied, and processing of the operation processing sequence is continued to proceed to the next instruction processing.

More preferably, the processing unit has a plurality of registers (Rn) configured to store operation data for the operation processing sequence, and the plurality of registers are connected, via to a bus, to other operation units which operates under a central processing unit and writing (that is, update of a value) to the registers from outside of the processing unit (DSP) is allowed, that is, such operation data is transferred from an application program of system processing running under control of a central processing unit (CPU). The bit field information includes data indicative of writing-operation occurred to one of the plurality of registers and such data is used as a trigger condition. Such writing-operations to the respective registers update the trigger conditions in the bit field information.

Then, the control logic circuit carries out the control in such a manner as to execute the instruction whose instruction stop flag information is cleared, and then to proceed to the next instruction processing after updating the program counter, in which execution of the instruction whose instruction stop flag information is set is stopped or temporarily haled if the execution resumption trigger condition corresponding to the bit field information is not satisfied, and execution of the instruction whose instruction stop flag information is set is resumed if the execution resumption trigger condition corresponding to the bit field information is satisfied, and execution of the operation processing sequence by the control logic circuit proceeds to the next instruction processing after updating the program counter.

More preferably, the processing unit has flag information (TRGn: SET_Rn) corresponding to each register of the plurality of registers (Rn, first register (R0) to n-th register Rn−1, for example), and when the application program of system processing running under control of the central processing unit writes operation data, for example, to the first register (R0) which is one of the plurality of registers, the corresponding first flag information (TRGn, for example, n=0) is set.

Then, the control logic circuit carries out the control in such a manner that execution of the instruction whose instruction stop flag information is set and in which the bit field information indicates that the writing to the first register is used as a resumption trigger is stopped if the first flag information is cleared, and if the first flag information is set thereafter, the instruction is executed to proceed to the next instruction processing after clearing the first flag information and updating the program counter. The control logic circuit further carries out the control in such a manner that the instruction whose instruction stop flag information is set and in which the bit field information indicates that the writing to the first register is used as a resumption trigger is executed as is if the first flag information is set, to proceed to the next instruction processing after clearing the first flag information and updating the program counter.

More preferably, the bit field of each instruction of the operation processing sequence includes event information (EVENT) for indicating an interruption output to outside. Also, the control logic circuit carries out the control in such a manner to, when the instruction whose event information is set has been executed, proceed to the next instruction processing after updating the program counter and simultaneously output an interrupt signal or a trigger pulse signal to outside.

Moreover, the micro controller unit having the processing unit according to an embodiment of the invention built therein includes: an A/D converter (ADC) for performing A/D conversion of voltage signals from the digital controlled power supply system; a processing unit (digital signal processor DSP) for performing filter operation of data from the A/D converter; a pulse width modulator (PWM) for calculating the duty of a PWM waveform to drive a power MOS transistor of the digital controlled power supply system; a direct memory access controller (DMAC) for performing data transfer from the A/D converter to the processing unit and data transfer from the processing unit to the pulse width modulator; and a central processing unit (CPU) for performing system processing. Such configuration of the processing unit as described above and the control by the control logic circuit in the above-described manner enables execution of the filter operation by the processing unit independently from and simultaneously with the system processing by the central processing unit.

Embodiments based on the outline of the embodiments described above will be described concretely below. The embodiments described below are just the examples using the present invention, and the present invention is not limited to the embodiments described below.

Embodiment

An embodiment of the present invention is described with reference to FIGS. 1 to 7.

<Control of DC-DC Converter by Micro Controller Unit>

FIG. 1 is a block diagram of an example of the DC-DC converter system controlled by a micro controller unit of this embodiment. In this embodiment, the system is configured with a micro controller unit (MCU) and other circuit elements.

The micro controller unit MCU mainly includes an A/D converter ADC for performing A/D conversion of input voltage signals and others, a digital signal processor DSP for performing filter operation of data from this A/D converter ADC, and a pulse width modulator PWM for generating the duty of PWM waveforms to drive the power MOS transistor of the DC-DC converter. The product of this micro controller unit MCU is described later with reference to FIG. 4.

The DC-DC converter includes two power MOS transistors (having a diode built therein) M1 and M2 which are connected in series between the power supply potential input from an input terminal IN and ground potential, two pre-buffers PB1 and PB2 for controlling each of the power MOS transistors M1 and M2, an inductor L and a capacitor C for smoothing which are connected between the connection node of the two power MOS transistors M1 and M2 and an output terminal. OUT, and two resistors R1 and R2 for dividing output voltages. The voltage divided by the resistors R1 and R2 becomes an input of the A/D converter ADC of the micro controller unit MCU as an input voltage signal. The output signals from the pulse width modulator PWM of the micro controller unit MCU are inputted to the pre-buffers PB1 and PB2.

Figure 2:
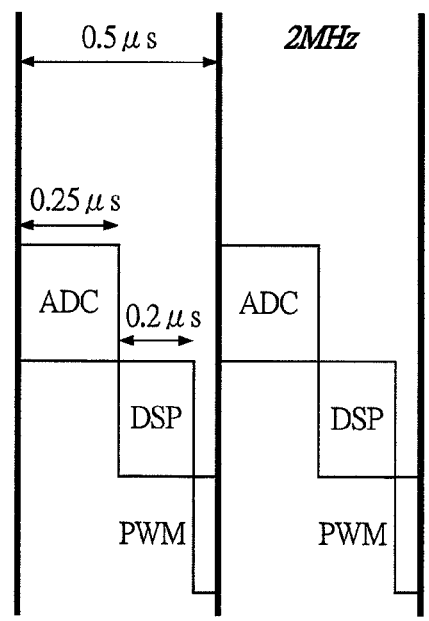
FIG. 2 is a timing diagram of DC-DC converter system controlled by a micro controller unit which utilizes this invention as an example.

In the above-described configuration, the flow of the feedback control loop processing of the DC-DC converter by the micro controller unit MCU is as follows. As an example, the flow is supplementarily explained with reference to FIG. 2 which is a timing chart showing an example of control of the DC-DC converter by this micro controller unit MCU. FIG. 2 shows an example of In-Cycle and 2 MHz.

First, A/D conversion (0.25 µs) of the input voltage signal and others is performed by the A/D converter ADC, a filter operation (0.2 µs) of the resulting data is performed by the digital signal processor DSP, the duty of the PWM waveform for driving the power MOS transistors M1 and M2 of the DC-DC converter is calculated by the pulse width modulator PWM, and this duty is set for the PWM timer in the pulse width modulator PWM (0.05 µs).

In this embodiment, the above-described flow from the A/D conversion to the PWM timer setting has no intervention of the central processing unit CPU in the micro controller unit MCU, and proceeds only with the hardware of the A/D converter ADC, the digital signal processor DSP, and the pulse width modulator PWM. For this reason, the configuration in which the CPU for performing systematic processing and the DSP for performing filter operation are operated independently and simultaneously is adopted. In this manner, load on both the system processing and the filter operation can be reduced and improvement in power consumption and performance can be achieved.

In addition to the components illustrated in FIG. 1, a module with a function as a direct memory access controller (DMAC) is provided. When the A/D converter ADC has finished the conversion, the DMAC automatically transmits data from the conversion result register of the A/D converter ADC to the data register of the digital signal processor DSP, starts the operation sequence of the DSP, and when the operation sequence of the DSP is completed, the DMAC similarly transmits the resulting data to the duty setting register of the PWM timer.

This embodiment is characterized in that the above-described configuration and system are adopted, and in particular, the following control is carried out. Details will be described later with reference to FIGS. 3 to 7 and others.

The digital signal processor DSP holds in advance the sequence for the filter operation described as an instruction row. More specifically, the instruction sequence is stored in the program memory (PM) only for the DSP. A trigger as to when to start this program can be, according to the above-described process flow, the writing of the conversion result data of the A/D converter ADC to the data register (Rn) of the DSP by the DMAC. However, the input data used in the processing sequence of the DSP is not necessarily limited to one. In the feedback control of the power supply, a voltage value and a current value are simultaneously used for calculation in some cases and a plurality of voltage values are compared in other cases.

The instruction sequence in the digital signal processor DSP can be arbitrarily decided according to the power supply system, and the number, the order of arrival, and the timing of the input data used in the sequence are not necessarily constant. For this reason, some ingenuity is required for the startup trigger of the DSP processing.

In this embodiment, starting of the instruction sequence of the digital signal processor DSP basically uses data write operation to the data register (Rn) of the DSP as a trigger; however, a system is adopted in which (1) flags (TRGn: SET_Rn) as many as the number of the data registers of the DSP are provided, and the flags are set when data is written to the corresponding data register of the DSP, (2) information indicating that execution of the instruction is waited until the writing to the data register of the DSP arrives is provided in an instruction code, that is, the trigger bit (TRIG_WAIT) indicating to restart from the instruction when the writing to the data register of the DSP is performed and the data register number field (TRIG_WHAT) of the DSP as to which writing to the data register of the DSP restarts the instruction are provided in the instruction code, (3) the flag is continued to be checked if the instruction to wait for the data write operation to the data register of the DSP is decoded, and (4) when the flag concerned is set and the instruction restarting condition is satisfied, the flag concerned is automatically cleared and instruction execution is resumed.

When the instruction sequence is completed and an operation result is prepared, an event signal is sent to the DMAC, the DMAC is made to read the data register of the DSP, and the operation result is transmitted to the duty setting register of the PWM timer. For this reason, an event bit (EVENT) for indicating that an event signal to the DMAC is outputted is provided in the instruction code. When the execution of the instruction to which this event bit is set is completed, the event signal is sent to the DMAC.

According to the above-described configuration, the direct memory access controller DMAC can write data to the predetermined data register of the digital signal processor DSP with the conversion termination trigger of the A/D converter ADC. Therefore, it can execute the instruction sequence up to where input data is needed in the instruction sequence of the DSP and stop the instruction execution until the data is written to the data register of the DSP, and resume the instruction execution when the data is ready in the data register of the DSP. Moreover, even when a plurality of input data are required, the instruction sequence may be temporarily stopped each time. In this manner, the operation processing can be executed while collecting any number of necessary data in any order in any sequence of the DSP.

<Digital Signal Processor>

Figure 3:
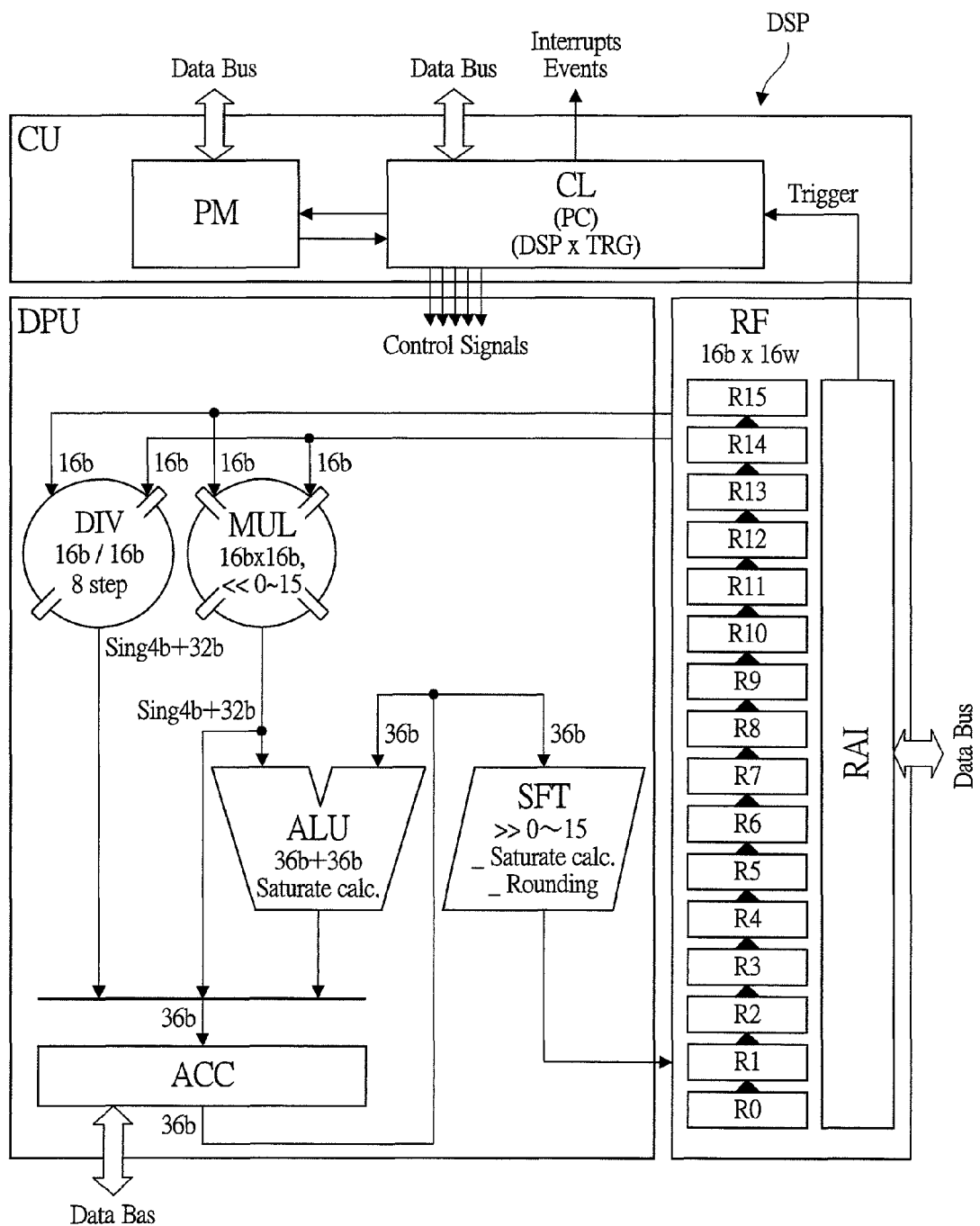
FIG. 3 is a block diagram of digital signal processor in a micro controller unit which utilizes this invention as an example.

FIG. 3 is a block diagram of an example of the digital signal processor DSP built in the above-described micro controller unit MCU.

The digital signal processor DSP exists as a module independent of the central processing unit CPU in the micro controller unit MCU, and includes the following resources. All operations in this DSP are performed in the fixed point form. Moreover, only integer arithmetic operation is performed internally, and a user (programmer) may assume the position of a decimal point freely.

(1) R0-R15 (Register)

The DSP has a register file RF including 16 pieces of 16-bit general-purpose registers Rn (n=0, 1, 2 . . . 15). This register Rn can be used for storing coefficient values during DSP operation and as an internal memory as a delay element of the digital filter. The Rn is connected to the internal bus (Data Bus) which can be read/written from the CPU or the DMAC. The Rn is connected to the input port of an MUL and DIV to be described later. Also, the Rn can also receive data from an ACC to be described later via an SFT.

(2) ACC (Accumulator)

The data path unit DPU of the DSP has one 36-bit length accumulator ACC to store the result of integration operation. The ACC receives a calculated result from the ALU, MUL, and DIV. The ACC can be accessed also from the CPU bus (Data Bus). When overflow occurs during the integration operation on the ACC, the operation result is saturated to the positive maximum value or negative minimum value.

(3) MUL (Multiplier)

The data path unit DPU of the DSP has one multiplier MUL and basically performs multiplication of 16 bits×16 bits. The MUL receives data from the Rn and outputs an operation result to the ALU or ACC.

(4) ALU (Operation Unit)

The data path unit DPU of the DSP has one operation unit ALU and basically performs addition operations of 36 bits+ 36 bits→36 bits.

(5) SFT (Shifter)

The data path unit DPU of the DSP has one shifter SFT and it has only a function of right shift. The SFT receives data of 36-bit width from the ACC, clips (cut out) a 16-bit width portion of the input value, and outputs 16-bit width data to the Rn. This clipping operation is equivalent to the right shift operation, and may cause overflow. When overflow occurs, the value outputted by the SFT is saturated to the positive maximum value or negative minimum value. Also, this clipping operation (right shift operation) rounds the least significant bit (LSB) to the nearest value.

(6) DIV (Divider)

The data path unit DPU of the DSP has one divider DIV and it performs an operation of "Rn (16-bit accuracy)/Rm (16-bit accuracy)→16-bit accuracy×(1/16-bit accuracy)→16-bit accuracy×16-bit accuracy→ACC (32-bit accuracy)". The division algorithm first calculates the inverse number of the Rm first based on the Newton-Raphson method, and then multiplies it by the Rn to obtain the final result. Internally, hardware only for division does not exist, and other internal resources (MUL, ALU, ACC and others described above) are used for division operation.

(7) PM (Program Memory)

The control unit CU of the DSP has a small-sized program memory PM built therein in order to set the execution sequence in the DSP. The size of the PM is 16-bit width×16 words. The length of each instruction is fixed to 16-bit width. This PM can store only an instruction of 16 steps at the maximum.

(8) RAI (Register Access Interface)

The register access interface RAI is an interface circuit for accessing the data register (register Rn) of the DSP from an internal data bus (Data Bus). RAI sends trigger information (Trigger) to indicate that a register write has been performed to the control logic circuit CL.

(9) CL (Control Logic Circuit)

The control logic circuit CL is a block to control the whole operation of the DSP. The CL includes a register for setting operations of the program counter PC and the DSP and a register for obtaining a status. The CL has a function to take in, decode, and execute instructions in the program memory PM. It can output control signals to the data path unit DPU to make it execute the operation processing based on each instruction. This CL includes a control/status register (DSPx TRG) as illustrated in FIG. 6 to be described later, and it stores flags and others to indicate that the writing to the data register (register Rn) of the DSP has been performed. This CL outputs interrupt event information (Interrupts Events).

As shown in (1) to (9) above, the digital signal processor DSP according to this embodiment is made up of the register file RF including the registers R0 to R15 and the register access interface RAI, the data path unit DPU including the accumulator ACC, the multiplier MUL, the operation unit ALU, the shifter SFT, and the divider DIV, and the control unit CU including the program memory PM and the control logic circuit CL.

<Micro Controller Unit Product>

Figure 4:
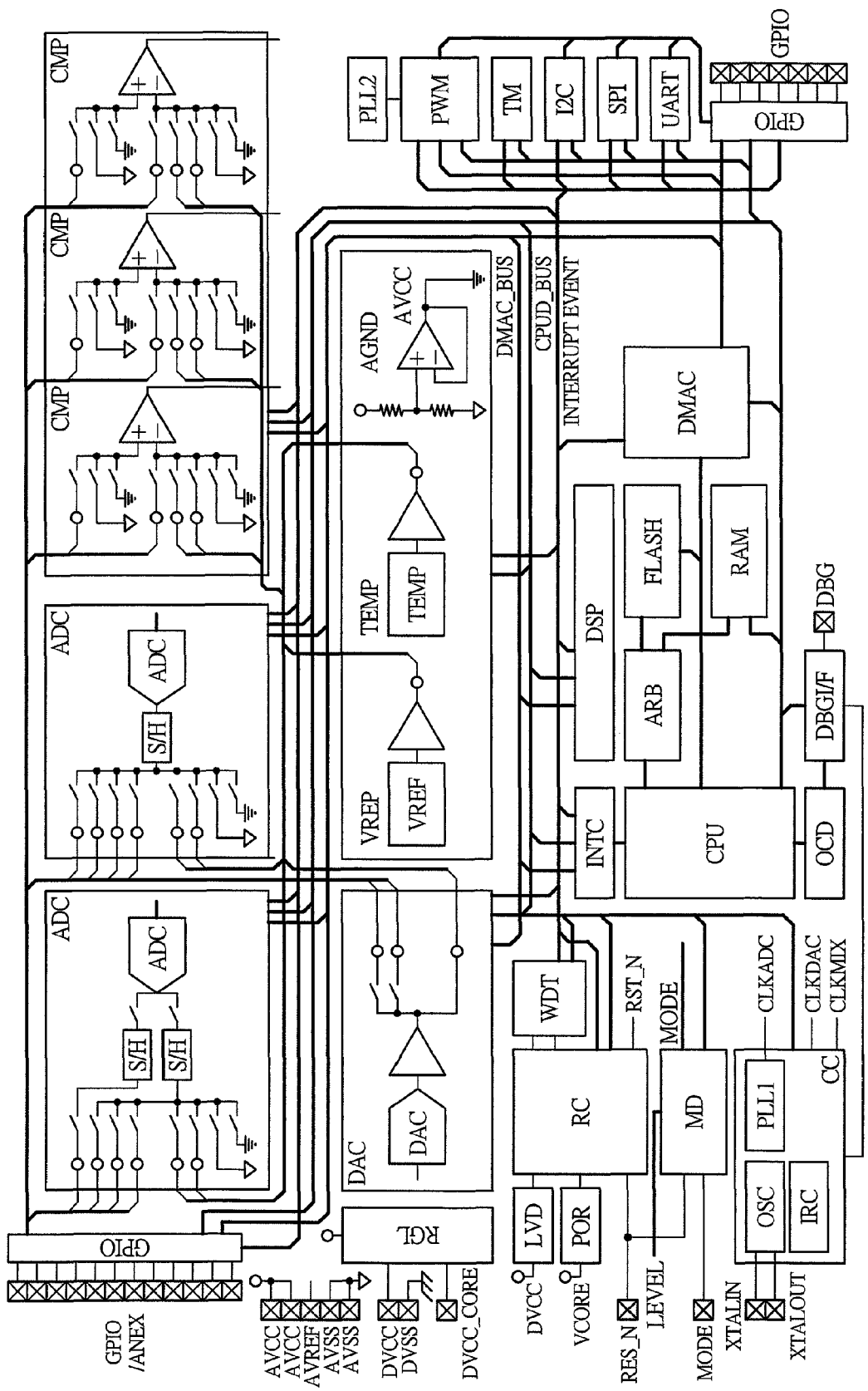
FIG. 4 is a block diagram of a micro controller unit including digital signal processor which utilizes this invention as an example.

FIG. 4 is a block diagram of an example of the micro controller unit product having the above-described digital signal processor DSP built therein.

The micro controller unit product includes the A/D converter ADC, the digital signal processor DSP, the pulse width modulator PWM, the direct memory access controller DMAC, and others as illustrated in FIG. 1 described above as well as a central processing unit CPU, an arbiter ARB, a flash memory FLASH, a random access memory RAM, an interruption controller INTC, a watchdog timer WDT, a reset controller RC, a power on reset circuit POR, a low voltage detection circuit LVD, a mode controller MC, a clock controller CC, a phase locked loop circuit PLL1, a ring oscillator OSC, an internal oscillator IRC, a debugger OCD, a debugger interface DBG I/F, a phase locked loop circuit PLL2, an interruption timer TM, a serial bus circuit I2C, a service provider interface SPI, a universal asynchronous receiver-transmitter UART, a comparator CMP, a regulator RGL, a D/A converter DAC, a reference power supply circuit VREF, a temperature sensor TEMP, an analog ground circuit AGND, an input output circuit GPIO and others.

In this micro controller unit product, in the blocks relevant to the features of this embodiment, for example, paths are provided, through which the direct memory access controller DMAC receives the conversion termination trigger from the A/D converter ADC and others, the data is transmitted from the A/D converter ADC to the digital signal processor DSP, then the direct memory access controller DMAC receives the trigger whose operation by the digital signal processor DSP has been finished, and the data is transmitted from the digital signal processor DSP to the pulse width modulator PWM. FIG. 1 described above shows the configuration when this operation by the micro controller unit is applied to the control of the DC-DC converter which is the digital controlled power supply system, and FIG. 2 described above shows the timing of this operation.

Operations of other blocks (CPU, ARB, FLASH, RAM, INTC, WDT, RC, POR, LVD, MC, CC, PLL1, OSC, IRC, OCD, DBG I/F, PLL2, TM, I2C, SPI, UART, CMP, RGL, DAC, VREF, TEMP, AGND, GPIO, and others) constituting this micro controller unit product are basically the same as the operations of conventional micro controller unit products; therefore, description thereof is omitted herein.

<Instruction Code of Digital Signal Processor>

FIG. 5 is an explanatory diagram showing an example of an instruction code table of the instruction set of the digital signal processor DSP described above.

This instruction code table records information of an instruction format (Instruction Format), an instruction type (Instruction), operation contents (Operation), and an execution cycle (Exec.Cycle). The instruction format includes the information of an instruction stop flag (TRIG_WAIT), a bit field (TRIG_WHAT), an event bit (EVENT), an operation code (OPCODE), an instruction field A (FIELD A), an instruction field B (FIELD B) in the 16 bits from the most significant bit MSB (bit15) to the least significant bit LSB (bit0).

Note that TRIG_WAIT is also referred to as an instruction stop flag as well as a TRIG_WAIT flag and others. TRIG_WHAT is also referred to as a bit field as well as a TRIG_WHAT field and others. EVENT is also referred to as an event bit as well as an EVENT bit and others.

Operation of each instruction is described below. A user stores these instructions in the program memory PM in advance. All the instructions have a trigger wait function and an event output function.

(1) 0x0 NOP

This NOP instruction is a no operation instruction. Only the program counter PC is incremented.

(2) 0x1 JMP

This JMP instruction changes the program counter PC to a specified address (4 bits) and jumps to it.

(3) 0x2 MUL

This MUL instruction multiplies Rn (16 bits) by Rm (16 bits), and stores the result in the last 32 bits of the accumulator ACC. The higher 4 bits of the accumulator ACC store the same value as the sign bit of the multiplication result.

(4) 0x3 MAC

This MAC instruction multiplies Rn (16 bits) by Rm (16 bits), performs sign extension of the obtained result to 36-bit length, and integrates it to a 36-bit value in the accumulator ACC. During this integration (addition) processing, when an overflow in the positive direction occurs, the integrated result is saturated to 0x7_FFFF_FFFF, and when an overflow in the negative direction occurs, the integration result is saturated to 0x8_0000_0000.

(5) 0x4 DIV

This DIV instruction first calculates the inverse number value of Rm (16 bits) and internally generates a value of 16-bit width accuracy. Then, it multiplies the result (16-bit width accuracy) by Rn (16 bits) and stores the value of 32-bit accuracy in the accumulator ACC. Sign extension is performed to the higher 4 bits.

The decimal point position is based only on the assumption of the program. For example, when the decimal point position of Rm is between bit 0 and bit −1 (that is, Rm is purely an integer value), the decimal point position of the inverse number value (1/Rm) of Rm comes between bit 15 (sign bit) and bit 14. Moreover, when the decimal point position of Rn is between bit 0 and bit −1 (that is, Rn is purely an integer value), the decimal point position of the final result of this DIV instruction entered in the accumulator ACC is placed between bit 15 and bit 14.

When the user takes out the operation result of the DIV instruction from the accumulator ACC, the RSF instruction is used to cut out the 16-bit width in any position of the accumulator ACC to store it in the register file RF.

Among the DSP instructions, only the DIV instruction is a multi cycle instruction (the number of the execution cycles is more than one).

(6) 0x5 LSF

This LSF instruction shifts Rm to the left by only n bits, and stores the value in the accumulator ACC. The left shift operation is realized by the multiplication operation at the multiplier MUL. The high order field of the accumulator ACC is filled by the sign extension. The low order field of the accumulator ACC is filled with 0.

(7) 0x6 RSF

This RSF instruction shifts the accumulator ACC (36 bits) to the right by only n bits, and stores the result in Rm of the register file RF. This means that the RSF instruction receives 36-bit width data from the accumulator ACC, clips (cuts out) the 16-bit width field from it, and stores it in Rm as 16-bit width data. There is a possibility that an overflow may occur in this clipping operation (right shift operation). In this case, however, a saturated result is generated. At the same time, the least significant bit LSB is rounded to the nearest value.

(8) 0x7 MVC

This MVC instruction transfers data among a plurality of registers in the register file RF with a chain coupling method, and is suitable for mounting a delay element of a digital filter. The target registers to be chain-coupled are limited to those having consecutive numbers. Based on the values of m and n in the instruction field, Rm receives data from Rm−1, Rm−1 receives data from Rm−2, and so on. At the same time, Rn+2 receives data from Rn+1, and Rn+1 receives data from Rn. The initial value in Rm is destroyed, and the value of Rn is maintained as it is. If the user specifies m<=n, this instruction works in a way equivalent to the NOP instruction.

The digital signal processor DSP of this embodiment operates with the functions provided by each instruction described in (1) to (8) above.

<Control/Status Register>

FIG. 6 is an explanatory diagram showing an example of the control/status register built in the control logic circuit CL in the digital signal processor DSP described above.

DSPxTRG (DSPx Execution Trigger Status Register, x indicates a channel of the DSP) is provided as the control/status register, and it is made up of pieces of information such as a bit number (Bit), a bit name (Bit Name), a read/write classification (R/W), an initial value (Initial), a description (Description), a note (Note) and others. The example of FIG. 6 illustrates an example of DSP0TRG of a "0" channel of the DSP and DSP1TRG of a "1" channel of the DSP.

In this DSPxTRG, when the writing is performed to one of the registers Rn in the register file RF of the DSP, a flag TRGn corresponding to this register Rn is set (SET_Rn, Rn=R0 to R7). The flags TRGn corresponding to each of these registers R0 to R7 are SET_R0 to SET_R7, respectively.

<Operation of Digital Signal Processor>

Figure 7:
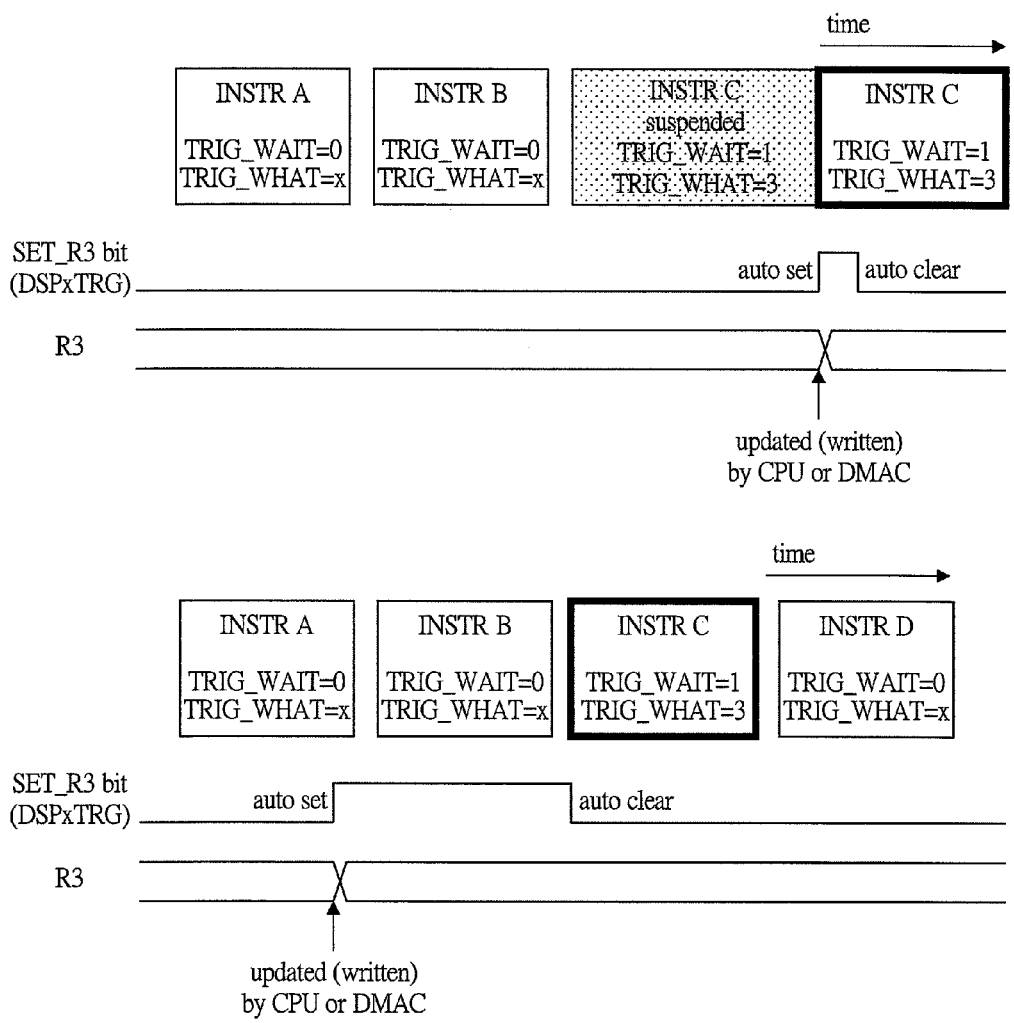
FIG. 7 is a timing description of execution start timing of instruction of digital signal processor which utilizes this invention as an example.

FIG. 7 is an explanatory diagram showing an example of the instruction start operation timing of the digital signal processor DSP described above. The instruction start operation of the DSP is described below. The whole operation of the DSP including this instruction start operation is controlled by the control logic circuit CL built in the DSP.

FIG. 7 illustrates an example to execute the instruction A (INSTR A), the instruction B (INSTR B), the instruction C (INSTR C), and the instruction D (INSTR D) in order. In each instruction, INSTR A is (TRIG_WAIT=0, TRIG_WHAT=x), INSTR B is (TRIG_WAIT=0, TRIG_WHAT=x), INSTR C is (TRIG_WAIT=1, TRIG_WHAT=3), and INSTR D is (TRIG_WAIT=0, TRIG_WHAT=x).

(1) The user should configure the DSP as follows in advance.

Write the instruction sequence (instruction row) in the program memory PM.

Set the initial value in the plurality of registers R0 to R15 in the register file RF (the coefficient or the initial value of the delay element).

Set the initial value of the program counter PC (setting of the starting position of the program).

(2) Operation of the whole DSP is enabled. For example, although details are not described, the operation of the DSP is started when a DSP enabling bit (DSPE) in the dedicated register is set from 0 to 1.

(3) The instruction sequence of the DSP starts and the instructions are executed in order from the position of the initial value of the PC. However, when the TRIG_WAIT flag (FIG. 5) in each instruction field is set, the instruction concerned stops before the execution thereof and waits for an input of corresponding trigger. When the write operation is performed to the register Rn (any one of R0 to R7) with the number corresponding to the TRIG_WHAT field (3 bits) in the instruction field of the stopped instruction, it serves as a resumption trigger to execute the stopped instruction and the execution instruction moves to the next address of the PC.

(4) The trigger status to resume the instruction is displayed in the dedicated register DSPxTRG illustrated in FIG. 6 (x represents a channel of the DSP, and x=0 and 1 in a product having two DSPs). For example, as illustrated in the upper part of FIG. 7, a stopped instruction before execution is waiting for the data writing (updated (written)) to R3 by the CPU or the DMAC. This is a situation of TRIG_WAIT=1 and TRIG_WAIT=3 in the instruction field of the instruction concerned. For controlling instruction execution, if the SET_R3 bit of the DSPxTRG register is 0, the instruction maintains the stopped state before execution, and when the DSP or the DMAC writes a value to R3, the SET_R3 bit is automatically set (auto set) and execution of the stopped instruction starts. At this time, the SET_R3 bit is automatically cleared (auto clear). A point to notice here is that the CPU does not need to access or monitor the DSPxTRG register during DSP operation. However, when debugging or reinitializing the whole DSP process, read (monitor) and write (initialize) operations by CPU are performed.

As illustrated in the lower part of FIG. 7, if a stop and resumption trigger is set in an instruction and a corresponding bit of the DSPxTRG register is set before executing the instruction (if the trigger condition is satisfied in advance), the instruction concerned does not stop and is executed as is. The corresponding bit of the DSPxTRG register is automatically cleared.

(5) If the PC reaches the last address (0xF) while the DSP is executing the instruction sequence, the PC is rewound to 0x0, and the instruction sequence by the DSP is continued.

(6) When the execution of the instruction whose EVENT bit in the instruction field is set to 1 is finished, the DSP can output event signals and interrupt signals to outside of the module.

(7) The DSP can be set to the debug mode to debug the DSP. This can be set by setting the dedicated bit DSP_DBG of the dedicated register in the debugger OCD illustrated in FIG. 4 described above. In this debug mode, every time one writing is performed to the dedicated bit DSP_STEP of the dedicated register, the instruction row can be executed one by one in a stepwise manner. In this debug mode, even if the TRIG_WAIT flag in the instruction field is set and the instruction resumption trigger condition is not satisfied (even if the bit concerned of the DSPxTRG register is 0), the instruction concerned is executed in a stepwise manner when one writing is performed to the DSP_STEP.

The whole operation of the DSP including instruction start operation can be controlled by the control logic circuit CL built in this DSP as described in (1) to (7) above.

Effect of Embodiment

According to the embodiment described above, a program memory PM, a program counter PC, a control logic circuit CL, a plurality of registers Rn and others are provided in the digital signal processor DSP, and an A/D converter ADC, a digital signal processor DSP, a pulse width modulator PWM, a direct memory access controller DMAC, a central processing unit CPU and others are provided in the micro controller unit MCU having the DSP built therein. As a result, the following effects can be achieved.

(1) Since the TRIG_WAIT flag and the TRIG_WHAT field are provided in the bit field of each instruction, the control logic circuit CL can carry out the control in such a manner that the instruction whose TRIG_WAIT flag is cleared is executed as is to proceed to the next instruction processing. Moreover, the control logic circuit CL can carry out the control in such a manner that execution of an instruction whose TRIG_WAIT flag is set is stopped if the execution resumption trigger condition corresponding to the TRIG_WHAT field is not satisfied, and the instruction is executed if the execution resumption trigger condition corresponding to the TRIG_WHAT field is satisfied, to proceed to the next instruction processing.

(2) In addition to the above-described (1), since the TRIG_WHAT field in the bit field of each instruction indicates which writing to the register out of those to the plurality of registers Rn is used as a trigger condition, the control logic circuit CL can carry out the control in such a manner that the instruction whose TRIG_WAIT flag is cleared is executed as is to proceed to the next instruction processing after updating the program counter PC. Moreover, the control logic circuit CL can carry out the control in such a manner that execution of an instruction whose TRIG_WAIT flag is set is stopped if the execution resumption trigger condition corresponding to the TRIG_WHAT field is not satisfied, and the instruction is executed if the execution resumption trigger condition corresponding to the TRIG_WHAT field is satisfied, to proceed to the next instruction processing after updating the program counter PC.

(3) In addition to the above-described (2), since flags (SET_Rn) corresponding to each register of the plurality of registers Rn are provided, and when the other processing unit writes to the first register Rn which is one of the plurality of registers Rn, the corresponding first flag TRGn is set, the control logic circuit CL can carry out the control in such a manner that execution of the instruction whose TRIG_WAIT flag is set and in which the TRIG_WHAT field indicates that the writing to the first register Rn is used as a resumption trigger is stopped if the first flag TRGn is cleared, and if the first flag TRGn is set thereafter, the instruction is executed to proceed to the next instruction processing after clearing the first flag TRGn and updating the program counter PC. On the other hand, the control logic circuit CL can carry out the control in such a manner that the instruction whose TRIG_WAIT flat is set and in which the TRIG_WHAT field indicates that the writing to the first register Rn is used as a resumption trigger is executed as is if the first flag TRGn is set, to proceed to the next instruction processing after clearing the first flag TRGn and updating the program counter PC.

(4) In addition to the above-described (2), since the bit field of each instruction includes an EVENT bit, the control logic circuit CL can carry out the control in such a manner to, when the instruction whose EVENT bit is set has been executed, proceed to the next instruction processing after updating the program counter PC and simultaneously output an interrupt signal or a trigger pulse signal to outside.

(5) According to the above-described (1) to (4), since the direct memory access controller DMAC can write data to the predetermined data register Rn of the digital signal processor DSP with the conversion termination trigger of the A/D converter ADC, it can execute the instruction sequence up to where input data is needed in the instruction sequence of the DSP and stop the instruction execution until the data is written to the data register of the DSP, and resume the instruction execution when the data is ready in the data register of the DSP. Moreover, even when a plurality of input data are required, the instruction sequence may be temporarily stopped each time. In this manner, the operation processing can be executed while collecting any number of necessary data in any order in any sequence of the DSP.

(6) According to the above-described (5), the event can be sent to the DMAC when the operation of the DSP is completed, thereby making the DMAC to transmit the operation result to the duty register of the PWM from the data register of the DSP. If the conversion start trigger of the ADC of this sequence of operations is set to, for example, the periodic event signal of the PWM, each process of input, operation, and output can be automatically executed among the ADC, the DSP, the PWM, and the DMAC without intervention of CPU, for example, feedback processing, which requires heavy processing resources for the digital filter operation in the DC-DC converter of the digital power supply system, can be automatically executed, and thus the CPU can concentrate on the system processing other than those. As a result, the load on both system processing and filter operation can be reduced, and improvement of power consumption and performance can be achieved.

Modification Example of Embodiment

In the embodiment described above, the writing to the data register of the digital signal processor DSP is used as an instruction restarting condition, but an example that uses the reading from the data register of the DSP as an instruction restarting condition is also possible. In this case, even if the data register of the DSP in which the operation result is stored is not read out, the result value is prevented from being overwritten and deleted.

In the foregoing, the invention made by the inventor of the present invention has been concretely described based on the embodiments. However, it is needless to say that the present invention is not limited to the foregoing embodiments and various modifications and alterations can be made within the scope of the present invention.

The processing unit of the present invention can be effectively applied particularly to a processing unit such as a digital signal processor built in a micro controller unit for a digital controlled power supply system and to a micro controller unit having the processing unit built therein. Moreover, it can be used for a digital power supply system, an inverter for AC motor control using this micro controller unit, and others.

What is claimed is:

1. A micro controller configured for system processing in a digital controlled power supply system, comprising:
   an A/D converter configured to perform A/D conversion of voltage signals from the digital controlled power supply system;
   a processing unit configured to perform filter operation of data from the A/D converter;
   a pulse width modulator configured to set a duty of a pulse width modulation waveform to drive a power MOS transistor in the digital controlled power supply system;
   a direct memory access controller configured to perform data transfer from the A/D converter to the processing unit and data transfer from the processing unit to the pulse width modulator; and
   a central processing unit configured to perform system processing for the digital controlled power supply system,
   wherein the processing unit performing the filter operation comprises:
   a program memory configured to store an operation processing sequence, which is configured with a row of instructions;
   a program counter configured to set an address indicative of which instruction is to be executed in the operation processing sequence; and
   a control logic circuit configured to control operation processing comprising:
   storing in the program memory the operation processing sequence, wherein each of the instructions of the operation processing sequence is configured to include a bit field having instruction stop flag information indicative of whether to stop execution of the instruction and bit field information indicative of an execution resumption trigger condition of the instruction;
   setting in the program counter an address indicative of which instruction is to be executed in the operation processing sequence; and
   executing an instruction whose instruction stop flag information is cleared and proceeding to processing of the next instruction, in which:
   execution of the instruction whose instruction stop flag information is set is stopped if the execution resumption trigger condition in the bit field information is not satisfied; and
   the instruction whose instruction stop flag information is set is executed if the execution resumption trigger condition in the bit field information is satisfied, and processing is proceeded to the next instruction,
   thereby to enable executing the filter operation by said processing unit independently from and simultaneously with the system processing performed by the central processing unit.

2. The micro controller according to claim 1,
   wherein the processing unit further comprises a plurality of registers configured to store the operation data which is transferred from the system processing running under the control of the central processing unit,
   wherein the control logic circuit carries out:
   updating the trigger conditions in the bit field information based on information on the current status of writing-operations of the operation data to the respective registers; and
   executing the instructions based on the updated trigger condition.

3. The micro controller according to claim 2,
   wherein the control logic circuit carries out:
   setting the instruction stop flag information correspondingly to the plurality of registers by turns when the writing-operations are performed to the registers, respectively, and
   executing the operation processing sequence based on the instruction stop flag information set correspondingly to the plurality of registers.

4. The micro controller according to claim 2,
   wherein the control logic circuit further carries out:
   to include event information indicative of an event or interruption output in the bit field of each of the instructions in the operation processing sequence, and
   to execute the instruction whose event information is set, and proceeding to processing of the next instruction after updating the program counter and simultaneously outputting an interrupt signal or a trigger pulse signal indicative of the event to the system processing running under the control of the central processing unit.

5. A micro controller configured for use with an apparatus including a power conversion circuit configured with a power MOS transistor, the micro controller being built on one chip of a semiconductor substrate and comprising, built on said one chip semiconductor substrate:
   a pulse width modulator configured to set a duty of a pulse width modulation waveform for driving the power MOS transistor;
   an A/D converter configured to perform A/D conversion of voltage signals supplied from the power conversion circuit;
   a filter operation processing unit configured to perform filter operation of data from the A/D converter and to supply results of the filter operation to said pulse width modulator; and
   a central processing unit configured to perform system processing, wherein the loop including the power conversion circuit, the A/D converter, filter operation, and the pulse width modulator configures a feedback control loop configured to perform a phase compensation in the system having the power conversion circuit,
   said filter operation processing unit comprising:
   a program memory configured to store an operation processing sequence for the filter operation, which is configured with a row of instructions;
   a program counter configured to set information indicative of which instruction is to be executed in the operation processing sequence; and
   a control logic circuit configured to control execution of the operation processing sequence, the control comprising:

storing in the program memory the operation processing sequence, wherein each of the instructions of the operation processing sequence is configured to include a bit field having instruction stop flag information indicative of whether to stop execution of the instruction and bit field information indicative of an execution resumption trigger condition of the instruction;

setting in the program counter information indicative of which instruction is to be executed in the operation processing sequence; and executing an instruction whose instruction stop flag information is cleared and proceeding to processing of the next instruction, in which:

execution of the instruction whose instruction stop flag information is set is temporarily halted if the execution resumption trigger condition in the bit field information is not satisfied; and execution of the instruction whose instruction stop flag information is set is resumed if the execution resumption trigger condition in the bit field information is satisfied, and processing of the processing sequence is proceeded to the next instruction, wherein the filter operation processing unit controls starting, temporal halting and resuming of the operation processing sequence based on the information set in the bit field of each instruction so as to execute processing of the feedback control loop independently from and simultaneously with the system processing running under control of the central processing unit.

6. The micro controller of claim 5 further comprising, built on said one chip semiconductor substrate, a direct memory access controller configured to perform data transfer from the A/D converter to the processing unit and data transfer from the processing unit to the pulse width modulator.

7. A processing unit configured for use with, or function of which is to be installed in, a micro controller which is configured for use with a system having a power conversion circuit configured with a power MOS transistor, the processing unit comprising:

a program memory configured to store an operation processing sequence, which is configured with a row of instructions;

a program counter configured to set an address indicative of which instruction is to be executed in the operation processing sequence; and a control logic circuit configured to control operation processing, the control comprising:

storing an operation processing sequence in said program memory, wherein each of the instructions of the operation processing sequence is configured to include a bit field having instruction stop flag information indicative of whether to stop execution of the instruction and bit field information indicative of an execution resumption trigger condition of the instruction;

setting in the program counter an address indicative of which instruction is to be executed in the operation processing sequence; and executing an instruction whose instruction stop flag information is cleared, and proceeding to processing of the next instruction, in which:

execution of the instruction whose instruction stop flag information is set is stopped if the execution resumption trigger condition in the bit field information is not satisfied; and the instruction whose instruction stop flag information is set is executed if the execution resumption trigger condition in the bit field information is satisfied, and processing is proceeded to the next instruction;

wherein the control of the operation processing sequence by the processing unit is performed independently from and simultaneously with system processing running under control of a central processing unit built in the micro controller.

8. The processing unit according to claim 7, wherein said processing unit further comprises a plurality of registers configured to store the operation data transferred from the system processing, wherein the control logic circuit carries out:

updating the trigger conditions in the bit field information based on information on the current status of writing-operations of the operation data to the respective registers; and executing the instructions based on the updated trigger condition.

9. The processing unit according to claim 8, wherein the control logic circuit carries out:

setting the instruction stop flag information correspondingly to the plurality of registers by turns when the writing-operations are performed to the registers, respectively, and executing the operation processing sequence based on the instruction stop flag information set correspondingly to the plurality of registers.

10. The processing unit according to claim 8, wherein the control logic circuit further carries out:

to include, in the bit field of each instruction in the operation processing sequence, event information indicative of an event or an interruption output, and to execute the instruction whose event information is set, and proceeding to the next instruction processing after updating the program counter and simultaneously outputting an interrupt signal or a trigger pulse signal indicative of the event to the system processing running under the control of the central processing unit.

11. A processing unit configured for use with, or function of which is to be installed in, a micro controller which is configured for use with a system having a power conversion circuit configured with a power MOS transistor, the processing unit comprising:

a program memory, a program counter, and a control logic circuit configured to perform:

storing in said program memory an operation processing sequence for enabling a digital filter operation, operation data of which is transferred from the system processing running under control of a CPU core of the micro controller, in which the operation processing sequence is configured with a row of instructions each configured to include a bit field having instruction stop flag information indicative of whether to stop execution of the instruction and bit field information indicative of an execution resumption trigger condition of the instruction;

setting in the program counter information indicative of which instruction is to be executed in the operation processing sequence; and executing an instruction having instruction stop flag information cleared, and then processing the next instruction in said row of instructions, in which:

execution of the instruction having instruction stop flag information set is halted if the execution resumption trigger condition in the bit field information is not satisfied; and execution of the instruction having instruction stop flag information set is resumed if the execution resumption trigger condition in the bit field information is satisfied, and the processing the next instruction, so as to enable executing the digital filter operation by said processing unit separately from and in parallel with the system processing under control of the CPU core.

12. A processing unit configured for use with, or function of which is to be installed in, a micro controller, the processing unit comprising:

a program memory, a program counter, and a control logic circuit configured to perform:

storing in said program memory an operation processing sequence, operation data of which is transferred from the system processing running under control of a CPU core of the micro controller, in which the operation processing sequence is configured with a row of instructions each configured to include a bit field having instruction stop flag information indicative of whether to stop execution of the instruction and bit field information indicative of an execution resumption trigger condition of the instruction;

setting in the program counter information indicative of which instruction is to be executed in the operation processing sequence; and executing an instruction having instruction stop flag information cleared, and then processing the next instruction in said row of instructions, in which:

execution of the instruction having instruction stop flag information set is halted if the execution resumption trigger condition in the bit field information is not satisfied; and execution of the instruction having instruction stop flag information set is resumed if the execution resumption trigger condition in the bit field information is satisfied, and the processing the next instruction, so as to enable executing the operation processing sequence by said processing unit separately from and in parallel with the system processing under control of the CPU core.

13. A micro controller configured for use with an apparatus including a power conversion circuit configured with a power MOS transistor, comprising:

a pulse width modulator configured to set a duty of a pulse width modulation waveform for driving the power MOS transistor;

an A/D converter configured to perform A/D conversion of voltage signals supplied from the power conversion circuit;

a filter operation processing unit configured to perform filter operation of data from the A/D converter and to supply results of the filter operation to said pulse width modulator; and a central processing unit configured to control system processing of the apparatus, wherein the loop including the power conversion circuit, the A/D converter, filter operation, and the pulse width modulator configures a feedback control loop configured to perform a phase compensation in the power conversion circuit, said filter operation processing unit comprising:

a program memory configured to store an operation processing sequence for the filter operation, which is configured with a row of instructions;

a program counter configured to set information indicative of which instruction is to be executed in the operation processing sequence; and a control logic circuit configured to control execution of the operation processing sequence, the control comprising:

storing in the program memory the operation processing sequence, wherein each of the instructions of the operation processing sequence is configured to include a bit field having instruction stop flag information indicative of whether to stop execution of the instruction and bit field information indicative of an execution resumption trigger condition of the instruction;

setting in the program counter information indicative of which instruction is to be executed in the operation processing sequence; and executing an instruction whose instruction stop flag information is cleared and proceeding to processing of the next instruction, in which:

execution of the instruction whose instruction stop flag information is set is temporarily halted if the execution resumption trigger condition in the bit field information is not satisfied; and execution of the instruction whose instruction stop flag information is set is resumed if the execution resumption trigger condition in the bit field information is satisfied, and processing of the processing sequence is proceeded to the next instruction, wherein the filter operation processing unit controls starting, temporal halting and resuming of the operation processing sequence based on the information set in the bit field of each instruction so as to execute processing of the feedback control loop independently from and simultaneously with the system processing running under control of the central processing unit.

14. The micro controller of claim 13, further comprising a direct memory access controller configured to perform data transfer from the A/D converter to the processing unit and data transfer from the processing unit to the pulse width modulator.

* * * * *